March 9, 1926.

G. SCHEIHING

WATER FOUNTAIN

Filed May 4, 1925

G. Scheihing, Inventor

By C. A. Snow & Co.

Attorneys

Patented Mar. 9, 1926.

1,575,796

UNITED STATES PATENT OFFICE.

GEORGE SCHEIHING, OF MORNING SUN, IOWA.

WATER FOUNTAIN.

Application filed May 4, 1925. Serial No. 27,894.

*To all whom it may concern:*

Be it known that I, GEORGE SCHEIHING, a citizen of the United States, residing at Morning Sun, in the county of Louisa and State of Iowa, have invented a new and useful Water Fountain, of which the following is a specification.

This invention relates to a watering trough or fountain for stock.

The object of the invention is to provide a trough of this character which is protected against freezing also against contamination by dust and the like.

Another object is to provide a fountain or trough of this character equipped with a plurality of compartments and accessible by means of inwardly swinging doors operable by the stock when access to the troughs for drinking purposes is desired.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Fig. 4 is a horizontal section taken on the line 4—4 of Fig. 1.

Figure 1:
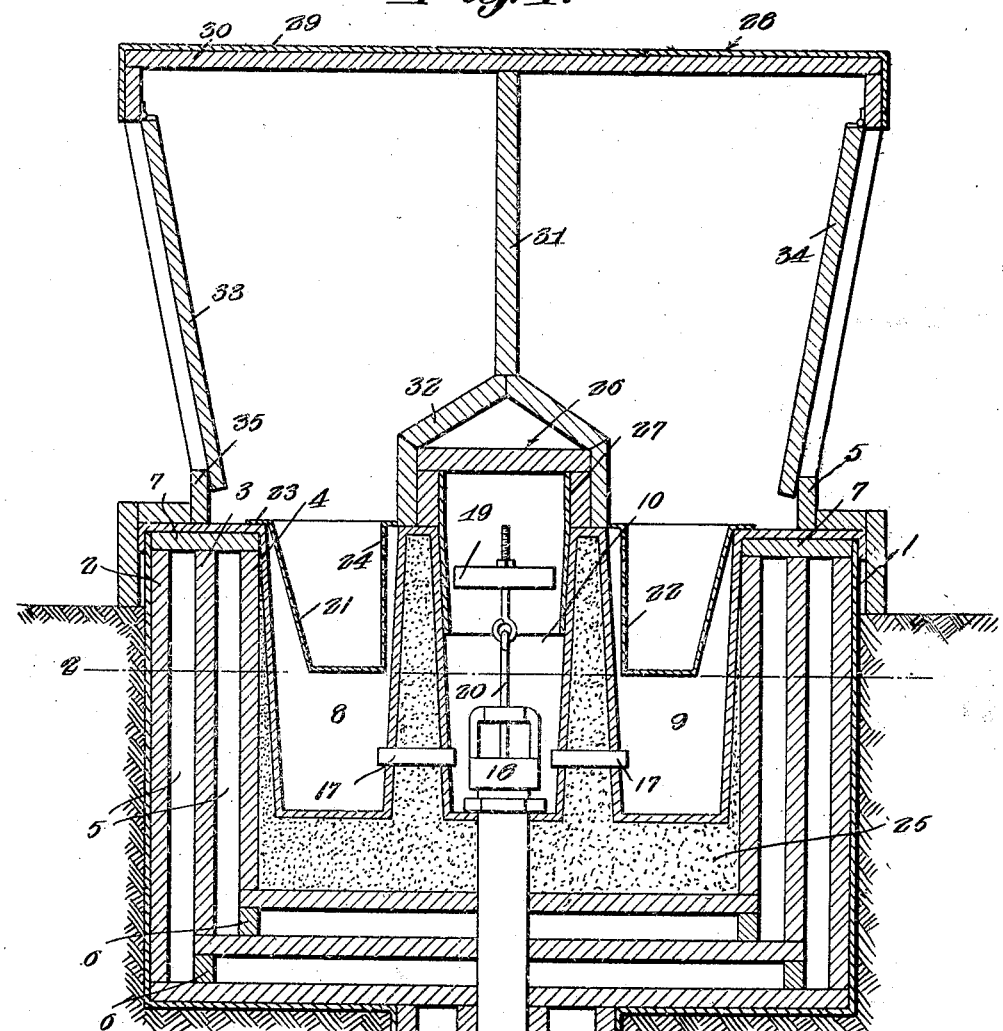
Figure 1 is a transverse section of a fountain constructed in accordance with this invention.

The fountain constituting this invention comprises a metal casing or shell 1 of any desired configuration being here shown rectangular. This casing 1 is lined with an insulating lining 2 preferably constructed of wood. Mounted within the lining 2 are two box-like members 3 and 4 spaced from each other to form dead air spaces 5 between them and which are supported on suitable timbers shown at 6 which also form spacers for the shells. The upper ends of these dead air spaces are closed by a wooden plate 7 which rests on the upper edges of the lining 2 and the boxes 3 and 4 as is shown clearly in Fig. 1. Water containing compartments or tanks 8 and 9 are located at opposite ends of the protective housing as shown clearly in Figs. 1 and 2 and have arranged between them a float containing chamber 10 to which water is supplied by an upright pipe 11 connected with a water main, not shown, which is embedded in the ground below the frost line. This pipe 11 is protected below the shell 1 by means of a housing 12 which is shown constructed of an outer metal shell 13 having an insulating lining 14 spaced some distance from the pipe 11 and between which and said pipe is an insulating member 15 which closely encircles the pipe leaving a dead air space 16 between it and the lining 14. This protective housing 12 extends into the ground below the frost line so that the pipe 11 leading from the float chamber 10 will be thoroughly protected against freezing in its passage through the earth before it is connected with the water main.

Pipe 17 connects the drinking compartments 8 and 9 with the float compartment 10 and are designed to supply water from the compartment 10 to the compartments 8 and 9.

An inlet valve of any suitable construction is shown at 18 within the compartment 10 and is controlled by a float 19 connected with the valve stem 20 so that when the water rises in the compartment 10 beyond a predetermined point the float lifts and closes the valve cutting off the supply. When the water in the drinking compartments 8 and 9 is lowered beyond a predetermined point the float 19 drops and the valve is opened until sufficient water enters these tanks when it again closes in the manner above set forth.

Figure 2:
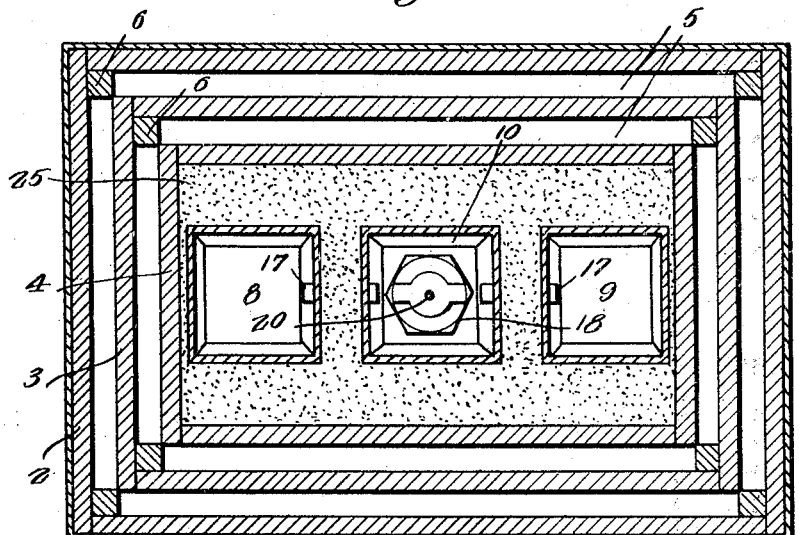
Fig. 2 is a horizontal section thereof taken on the line 2—2 of Fig. 1.
Figure 3:
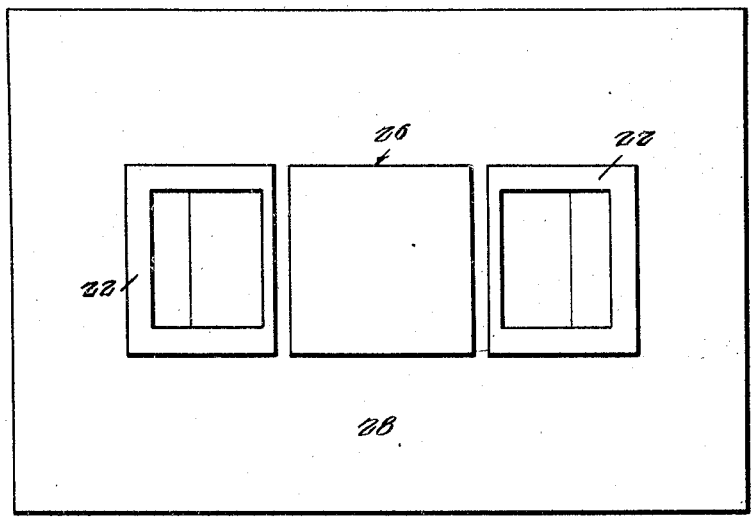
Fig. 3 is a top plan view of the fountain.

Drinking cups 21 and 22 are mounted in the tanks 8 and 9 to protect these tanks against the entrance of trash or rather to catch any such trash which may drop in so that it may be readily cleaned out by lifting out the cups which are equipped at their upper ends with laterally extending flanges 23 which rest on the top of the casing or shell of the fountain as is shown clearly in Fig. 1. These cups 21 and 22 are equipped with apertures 24 for the entrance of water to them. An insulated packing of saw-dust, ground cork or the like is shown at 25 being arranged in the box 4 between it and the compartments 8, 9 and 10 and also between the respective compartments as is shown clearly in Figs. 1 and 2.

The float compartment 10 is equipped with a cover in the form of a cap 26 which is shown metal lined and the lining 27 extended down into the chamber 10 while the body portion of the cap rests on the float tank.

A protective cover 28 is mounted over the fountain 1 and is shown composed of a metal shell 29 having an insulating lining 30. Depending from this shell or cover 29 is a partition 31 shown arranged centrally therein and having a cap 32 carried by its lower end which fits over and protects the cap 26 of the compartment 10 (see Fig. 1).

Inwardly swinging doors 33 and 34 are hingedly mounted at their upper ends to the end walls of the cover 28 and are inclined downwardly and inwardly and adapted to abut at their lower ends when in closed position against upstanding cleats 35 which form a part of the supporting base of the cover 28. These doors 33 and 34 afford access to the drinking cups 31 and 32 and are designed to be pushed inwardly by the stock when water is desired. The animals soon learn how to do this and simply push against the doors which after being released swing outwardly by gravity into closed position and thus protect the water against freezing and against contamination by dust and the like.

From the above description it will be obvious that a watering box or trough constructed in accordance with this invention will have the drinking cups or water tanks fully protected against the weather and against contamination and yet are readily accessible to the stock by simply opening the doors 33 and 34.

After the apparatus is once connected up it is automatic in its operation since the float controlled valve 18 supplies the necessary water to the tanks 8 and 9 and lets it on and cuts it off as is necessary.

While this fountain is shown and described as having two drinking compartments 8 and 9 obviously more may be used if found desirable to do so and the one float compartment 10 will supply several others.

I claim:—

A fountain of the class described comprising an insulated water tank a float compartment having a water supply pipe opening thereinto and provided with an inlet valve connected with said float whereby the valve is opened and closed on the rising and falling of the water in said compartment, a pipe connecting said compartment with said tank, a protective covering for said tank, a door affording access to said tank and mounted to swing inwardly at its upper end, whereby the stock may open the door and drink from the tank, and a cap-like cover mounted over said float chamber, and a protective covering for the fountain having a depending member resting on said cap and holding it closed.

In testimony that I claim the foregoing as my own, I have hereto affixed my signature.

GEORGE SCHEIHING.